United States Patent [19]

Ueda et al.

[11] Patent Number: 5,153,260

[45] Date of Patent: Oct. 6, 1992

[54] RESIN COMPOSITIONS FOR LIGHT CONTROL SHEETS, AND LIGHT CONTROL SHEETS PREPARED FROM SAID COMPOSITIONS

[75] Inventors: Masahiro Ueda, Minoo; Kazumitsu Kawamura, Toyonaka; Tetsuro Oono, Takatsuki; Shinichi Takemura, Ibaraki, all of Japan

[73] Assignees: Sumitomo Chemical Company, Limited; Nippon Sheet Glass Co., Ltd., both of Osaka, Japan

[21] Appl. No.: 618,498

[22] Filed: Nov. 27, 1990

[30] Foreign Application Priority Data

Nov. 30, 1989 [JP] Japan ................... 1-312706

[51] Int. Cl.$^5$ ............................................. C08K 3/36
[52] U.S. Cl. ..................... 524/847; 524/88; 524/425; 524/430; 524/493
[58] Field of Search ............... 524/88, 425, 430, 493, 524/847

[56] References Cited

U.S. PATENT DOCUMENTS

| | | | |
|---|---|---|---|
| 4,024,296 | 5/1977 | Gruber | 522/4 |
| 4,447,520 | 5/1984 | Hemme et al. | 430/281 |
| 4,929,523 | 5/1990 | Kitayama et al. | 430/4 |
| 4,994,348 | 2/1991 | Raabe et al. | 430/287 |
| 5,013,768 | 5/1991 | Kiriyama et al. | 524/847 |

FOREIGN PATENT DOCUMENTS

| | | |
|---|---|---|
| 0272582 | 6/1988 | European Pat. Off. |
| 0331007 | 9/1989 | European Pat. Off. |

OTHER PUBLICATIONS

Chemical Abstracts, vol. 110, No. 8, 20th Feb. 1989, p. 52, abstract no. 58826e, Columbus, Ohio, US; & JP-A-63 112 611 (Denki Kagaku Kogyo K.K.) 17 May 1988.

*Primary Examiner*—Paul R. Michl
*Assistant Examiner*—Edward Cain
*Attorney, Agent, or Firm*—Stevens, Davis, Miller & Mosher

[57] ABSTRACT

A resin composition comprising a photo-polymerizable resin and a filler having an average particle size of 0.05–20 μm can be used to be photo-polymerized to yield a light control sheet which may have a thickness of 100 μm or less. Therefore, the resin composition makes it possible to lower the heat generation and curing distorting during a curing step and to make small the necessary amount of the composition for preparing a light control sheet.

12 Claims, No Drawings

RESIN COMPOSITIONS FOR LIGHT CONTROL SHEETS, AND LIGHT CONTROL SHEETS PREPARED FROM SAID COMPOSITIONS

BACKGROUND OF THE INVENTION

1. Field of the Invention

The present invention relates to resin compositions for light control sheets. In addition, the invention relates to light control sheets prepared by using such resin compositions.

2. Related Art Statement

It is known from the disclosures of Japanese Patent KOKAI (Laid-open) No. 147405/1989 that a light control sheet can be prepared by a process wherein an UV ray is irradiated onto a photo-polymerizable composition comprising at least two compounds having different refractive indexes. For instance, there are known compositions which contain urethane monomers or oligomers and bromine-containing monomers and the like. Such known compositions may be fabricated into light control sheets having good optical properties.

As mentioned above, the known compositions have good light control properties, but it is still described that a further improvement should be made on such compositions. Generally, the opaque area (i.e. the light-scattering area) of a light control composition, which has been cured, should have a high haze value, and the transparent area of the composition should have a light transmittance of at least 95%. According to the prior art, a cured composition, which met the above-mentioned conditions, inevitably had a thickness of 200 to 300 $\mu$m. However, it is highly desired to provide a thinner cured composition for the reasons given below.

Namely, a decrease of the thickness of cured compositions is highly desirable for the following two reasons. Firstly, there is a problem of the polymerization reaction heat generated in a large scale production of light control sheets. In the case of photopolymer sheets, it is recognized that a sheet, having a thickness of 200 to 300 $\mu$m, is a relatively thick sheet. In the course of the production of a polymer sheet, there is a polymerization reaction accompanying an instantaneous generation of a large amount of heat, so that there may occur a distortion in the substrate layer or the light control polymer layer of the sheet, and also there may occur a disorder in the structure formed in the sheet and having the characteristic optical properties. It is expected that such a vigorous heat generation and a distortion of cured polymer structure might be eliminated, if the thickness of such a light control sheet is decreased.

Secondly, it is considered that the amount of the composition can be decreased by a decrease of the thickness of the sheet. This gives an economical effect.

SUMMARY OF THE INVENTION

The present invention provides a resin composition for use in the production of a light control sheet, which resin composition comprises:

(A) 100 Parts by weight of at least one photo-polymerizable resin composition selected from the group consisting of:
  (i) compositions which contain at least two different monomers or oligomers each having a polymerizable carbon-carbon double bond, with the proviso that these different monomers or oligomers may form polymers having different refractive indexes,
  (ii) compositions which contain a compound having no polymerizable carbon-carbon double bond, and also contain at least one monomer or oligomer which has a polymerizable carbon-carbon double bond and which is convertible into a polymer having a refractive index different from that of said compound; and
  (iii) compositions which contain at least one monomer or oligomer having at least two polymerizable carbon-carbon double bonds in the molecule, with the proviso that the refractive index of the monomer or oligomer is different from that of a polymer formed from said monomer or oligomer; and
(B) 0.01 to 5 parts by weight of a filler having an average particle size of 0.05-20 $\mu$m.

The invention also provides a light control sheet produced by a light irradiation onto a resin composition mentioned above.

DETAILED DESCRIPTION OF THE INVENTION

As one of the photo-polymerizable compositions employed according to the invention, there may be mentioned a composition which comprises at least two different monomers or oligomers each having a polymerizable carbon-carbon double bond, so that the monomers or oligomers are convertible into polymers having different refractive indexes. The monomers or oligomers employed here are compounds having at least one carbon-carbon double bond in the molecule. For instance, the monomers or oligomers may be those having at least one polymerizable radical such as acryloyl, methacryloyl, vinyl or allyl radical in the molecule. Any combinations of the monomers or oligomers may be used with the proviso that the monomers or oligomers should be ones which are photo-polymerizable under an irradiation of light (e.g., UV-light) to form polymers having different refractive indexes, and with the other proviso that the monomers or oligomers should have different reactives and also should have a suitable mutual solubility. In individual cases, the selection of monomers or oligomers may be made in consideration of the chemical and physical properties of the resins. Preferred examples of monomers or oligomers are polyfunctional acrylates including polyester acrylates, polyol polyacrylates, modified polyol polyacrylates, polyacrylates having isocyanurate skeletons, melamine acrylates, polyacrylates having hydantoin skeletons, polybutadiene acrylates, epoxy acrylates, urethane acrylates and the like, and similar methacrylates; monofunctional acrylates including tetrahydrofurfuryl acrylates, ethyl carbitol acrylates, dicyclopentenyloxy-ethyl acrylates, phenyl carbitol acrylates, nonyl phenoxyethyl acrylates, 2-hydroxy-3-phenoxypropyl acrylate, $\omega$-hydroxyhexanoyloxy-ethyl acrylate, acryloyloxyethyl succinate, acryloyloxyethyl phthalate, phenyl acrylate, tribromophenyl acrylate, phenoxyethyl acrylate, tribromophenoxyethyl acrylate, benzyl acrylate, p-bromobenzyl acrylate, bisphenol-A diacrylate, 2,2-bis(4-methacryloxyethoxy-3,5-dibromophenyl)propane, isobornyl acrylate, 2-ethylhexyl acrylate, lauryl acrylate, 2,2,3,3-tetrafluoropropyl acrylate and the like, and similar methacrylates; vinyl compounds such as styrene, p-chlorostyrene, divinylbenzene, vinyl acetate, acrylonitrile, N-vinylpyrrolidone, vinylnaphthalene and the like; and allyl compounds such as diethyleneglycol-bis-(allyl carbonate), triallyl isocyanurate, diallylidene-pentaerythritol, diallyl phthalate, diallyl isophthalate and the like.

In the photo-polymerizable compositions employed according to the invention, use is made of a mixture of at least two photo-polymerizable monomers or oligomers selected from the class consisting of those listed above, with the proviso that the corresponding two homopolymers should have different refractive indexes.

Preferably, the two or more different monomers or oligomers are those which meet the condition that the difference in refractive index between the corresponding homopolymers is at least 0.01, more preferably at least 0.05. When the three or more different monomers or oligomers are used, these may be ones which meet the above-mentioned conditions relating to the difference in refractive index between the two of the corresponding homopolymers. Advantageously, the two photo-polymerizable monomers or oligomers, wherein the difference in refractive index is at least 0.01, are mixed with each other in a weight ratio between 10 : 90 and 90 : 10.

As a preferred example of combinations of at least two different monomers or oligomers which have a polymerizable carbon-carbon double bond and which are convertible into polymers having different rafractive indexes, there may be mentioned a homogeneous mixture of polyether-urethane acrylate and ethylene oxide-modified tribromophenol acrylate, with the proviso that the difference in refractive index between the corresponding two polymers is about 0.14. Furthermore, aspect from the difference in refractive index, these monomers should have different reactivities or reaction velocities, in order to form different domain structures which have the light control properties.

As another class of the photo-polymerizable compositions employed in the invention, there may be mentioned a composition which contains a compound not having a polymerizable carbon-carbon double bond, and at least one monomer or oligomer which has a polymerizable carbon-carbon double bond and is convertible into a polymer having a refractive index different from that of said compound. The expression "a compound not have a polymerizable carbon-carbon double bond in the molecule" means a compound not having a polymerizable radical such as acryloyl, methacryloyl, vinyl, allyl radical or the like in the molecule. Examples of said compounds are polymers such as polystyrenes, polymethyl methacrylates, polyethylene oxides, polyvinyl pyrrolidones, polyvinyl alcohols, nylons, polyalkylene glycols including polyethylene glycols, polypropylene glycols, etc.; organic compounds such as toluene, n-hexane, cyclohexane, methyl alcohol, ethyl alcohol, acetone, methyl ethyl ketone, tetrahydrofurane, ethyl acetate, dimethyl formamide, dimethyl acetamide, acetonitrile, etc.; halogenated derivatives of these organic compounds; additives for plastics such as plasticizers, stabilizers and the like.

As at least one monomer or oligomer which has a polymerizable carbon-carbon double bond and which is convertible into a polymer having a refractive index different from that of the above-mentioned compound, it is possible to use one or more monomers or oligomers mentioned above. The refractive index of the above-mentioned compound must be different from that of the polymer corresponding to said monomer or oligomer.

The difference in refractive index should be at least 0.01, preferably at least 0.05. Preferably, the compound is mixed with the monomer or oligomer in a weight ratio between 10 : 90 and 90 : 10.

There is a preferred composition which contains at least one monomer or oligomer which is convertible into a polymer having a refractive index different from that of the compound. As an example of such compositions, there may be mentioned a homogeneous mixture of polystyrene (refractive index: about 1.59) and polyether-urethane acrylate (refractive index of the corresponding polymer: about 1.49).

According to the invention, it is also possible to use the other class of photo-polymerizable compositions which contain at least one monomer or oligomer having two or more polymerizable carbon-carbon double bonds in the molecule and having a refractive index different from that of the corresponding polymer, produced from the monomer or oligomer. Examples of such monomers or oligomers are those containing at least two polymerizable radicals such as acryloyl, methacryloyl, vinyl, allyl radicals and the like in the molecule. These monomers or oligomers have a refractive index different from that of the corresponding polymers formed therefrom. It is preferred to use monomers or oligomers having a refractive index different by at least 0.01 from that of the corresponding polymers. Examples of such monomers are acrylates such as triethylene glycol acrylate, polyethylene glycol diacrylate, neopentyl glycol diacrylate, 1,6-hexanediol diacrylate, hydrogenated dicyclopentadienyl diacrylate, ethylene oxide-modified bisphenol-A diacrylate, trimethylol propane triacrylate, pentaerythritol hexacrylate, tris(acryloxy) isocyanurate, polyfunctional urethane epoxy acrylate, polyfunctional urethane acrylates, polyfunctional modified polyol polyacrylates and the like; methacrylates corresponding to these acrylates; divinyl benzene, triallyl isocyanurate, diethyleneglycol-bis-(allyl carbonate), etc. For instance, the refractive index of trimethylol propane triacrylate before polymerization is 1.477, whereas the refractive index of said compound after polymerization is 1.520.

In order to enhance the curability, it is preferred to use a photo-polymerization initiator. There are no limitation on the use of photo-polymerization initiators. It is possible to employ any conventional photo-polymerization initiators. Examples of such initiators are benzophenone, Michler's benzyl ketone, 2-chloro-thioxanthone, 2,4-diethyl-trioxanthone, benzoin ethyl ether, diethoxyacetophenone, benzyl methyl ketal, 2-hydroxy-2-methyl-propiophenone, 1-hydroxy-cyclohexyl phenyl ketone and the like.

According to the invention, use is made of fillers, which may be inorganic and organic fillers, and pigments.

Examples of inorganic fillers are silica, calcium carbonate, alumina and mixtures thereof, as well as those fillers having surfaces treated with a compound having hydrophobic properties.

As examples of organic fillers, there may be mentioned polyolefins such as polyethylenes, polypropylenes and the like, ethylene copolymers, polyesters, polyamides, polystyrenes, polyvinyl chlorides, polycarbonates, polysulfones, poly(meth)acrylates, etc. It is also possible to use mixtures of these polymers. Examples of polyacrylates are homopolymers and copolymers of aliphatic acrylates, aromatic acrylates, metal-containing acrylates (ionomers) and the like.

As further examples of fillers which may be used according to the invention, there may be mentioned homopolymers and copolymers derived from monomers having any of the following radicals:

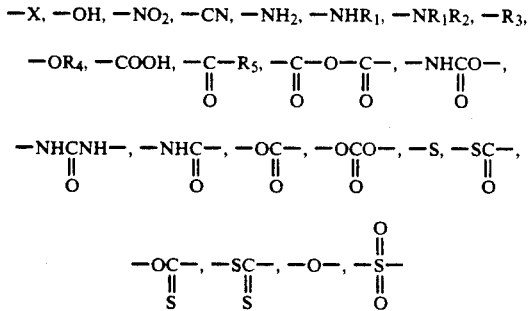

wherein

X represents halogen, $R_1$ and $R_2$ each represent alkyl, $R_3$ represents alkyl, aryl or hydrogen, and $R_4$ and $R_5$ each represent alkyl or aryl.

When pigments are used as fillers according to the invention, the pigments will have not only a filling effect but also a coloring effect. Examples of pigments are inorganic pigments such as titanium white, white lead, cobalt compounds, iron compounds, chromium compounds, cadmium compounds and the like; and organic pigments such as phthalocyanine, dioxazine and anthraquinone pigments, etc.

The fillers employed according to the invention have an average particle size of 0.05 to 20 μm, preferably 0.1 to 10 μm. The use of a filler having an average particle size of less than 0.05 μm will not give an appreciable effect on the optical properties of the product. Namely, the optical properties of the product, which contains such a very fine filler, are virtually the same as that of the product containing no fillers. On the other hand, a filler, having an average particle size of greater than 20 μm, is not preferred, because it will cause a decrease of transparency of the products.

The amount of fillers contained in the compositions according to the invention has a great influence on the optical properties of the light control sheets. The larger the amount of fillers contained in the compositions, the greater the promotion effect on the forming of the microstructures which have the light control properties. However, the use of an excessively large amount of fillers is not preferred, because a light scattering occurs even in an area which is to be normally transparent.

Therefore, fillers should be used in a suitable amount depending on the nature of the fillers. Generally, fillers are used in an amount of 0.01 to 5 parts, preferably 0.03 to 3 parts, more preferably 0.05 to 1 part by weight per 100 parts by weight of the photo-polymerizable resin compositions.

The resin compositions for light control sheets can be prepared by any of conventional manners, including blending or mixing operations. It is also possible to employ a masterbatch method in order to improve the dispersibility of fillers.

The production of light control sheets from the resin compositions according to the invention may be carried out in a conventional manner. For instance, there is a method, wherein a sheet of the resin composition is formed on a substrate, and a light irradiation is effected as a batch operation or a continuous operation. Another method comprises carrying out a light irradiation on a laminate having the resin composition and a spacer between two substrate layers. The selection of the methods may be made in consideration of the purpose in individual cases.

As light to be irradiated, use may be made of visible light, UV-light, etc., with the proviso that the light should be one which can cause a photo-polymerization reaction. UV-light is preferred. For instance, a mercury lamp, a metal halide lamp and the like may be employed.

A known light control sheet must have a thickness of 200 to 300 μm in order to provide a good light control property. On the other hand, in the case of a novel light control sheet produced by subjecting a composition according to the invention to a photo-polymerization, the thickness of the light control sheet may be at most 100 μm. Therefore, the heat generation during the curing step is considerably low, and there is no virtual curing distortion. Furthermore, the necessary amount of the present compositions is smaller than that of the known compositions, and therefore the invention is advantageous in view of economy.

The present invention will become more readily apparent from the following examples and comparative examples.

EXAMPLES 1

A photo-polymerizable resin composition was prepared by mixing 100 parts by weight of a polyetherurethane acrylate (refractive index: 1.488) consisting of polytetramethylene ether glycol, toluene diisocyanate and hydroxyethyl acrylate; 100 parts by weight of tribromophenyl methacrylate (refractive index: 1.620); and 6 parts by weight of benzyl dimethyl ketal. 100 parts by weight of the resultant photo-polymerizable resin composition were admixed with 0.05 part by weight of microbeads of an aliphatic polyacrylate which had an average particle size of 1 to 2 μm and which were obtained by a suspension polymerization of a polyfunctional acrylate (DPCA), which was a commercial product manufactured by Nihon Kayaku Co., Ltd.

The resulting composition was coated as a layer having a thickness of 75 μm on a substrate plate. After that, the laminate thus formed was placed on a position which was about 1 m below a rod type UV-lamp (80 w/cm × 70 cm). The UV-irradiation was effected for about 1 minute to cure the sheet. The haze value of the cured sheet was determined to evaluate the incidental light-scattering properties of the sheet in conformity to the JIS K 6714. The test results are shown in Table 1.

EXAMPLE 2

The procedures shown in Example 1 were repeated to obtain a cured sheet, except that use was made of 1.0 part by weight of the microbeads described in Example 1. The haze value of the resulting cured sheet was determined. The test results are shown in Table 1.

EXAMPLE 3

The monomers, which were the same as those employed in the preparation of the microbeads shown in Example 1, were employed to prepare a massive polymer, which was then ground so as to obtain a polyacrylate powder having an irregular shape with an average particle size of about 5 μm.

The procedures of Example 1 were repeated to form a cured sheet, except that the above-mentioned powder was used in an amount of 0.05 part by weight. The haze value of the resulting cured sheet was determined. The test results are shown in Table 1.

EXAMPLE 4

The procedures of Example 1 was repeated to obtain a cured sheet, except that the filler employed was 0.05 part by weight of a silica filler having an irregular grain shape and an average particle size of 10 μm. The haze value of the resulting cured sheet was determined. The test results are shown in Table 1.

EXAMPLE 5

In order to produce a cured sheet having a thickness of 100 μm, the procedures of Example 1 were repeated, except that the filler employed was 0.4 part by weight of an organic phthalocyanine pigment having an irregular particle shape with an average particle size of 5 μm. The test results are shown in Table 1.

COMPARATIVE EXAMPLES 1 and 2

The procedures of Example 1 were repeated, except that no fillers were used. Two cured sheets, having a thickness of 75 and 200 μm, respectively, were obtained. The test results are shown in Table 1.

COMPARATIVE EXAMPLE 3

The procedures of Example 1 were repeated to obtain a cured sheet, except that the microbeads of aliphatic polyacrylate, shown in Example 1, were employed in an amount of 7.5 parts by weight. The haze value of the cured sheet was determined, and the test results are shown in Table 1.

COMPARATIVE EXAMPLE 4

The procedures of Example 1 were repeated to obtain a cured sheet, except that the microbeads of aliphatic polyacrylate, shown in Example 1, were used in an amount of 0.005 part by weight. The haze value of the cured sheet was determined, and the test results are shown in Table 1.

COMPARATIVE EXAMPLE 5

The procedures of Example 1 were repeated to obtain a cured sheet, except that 0.05 part by weight of microbeads, having an average particle size of 75 μm, was employed. The microbeads were composed of the same aliphatic polyacrylate as that shown in Example 1. The haze value of the cured sheet was determined, and the test results are shown in Table 1.

EXAMPLE 6

A photo-polymerizable resin composition was prepared by mixing 100 parts by weight of a commercial polyfunctional acrylate (DPCA) (refractive indexes: 1.486 (before polymerization) and 1.518 (after polymerization)), manufactured by Nihon Kayaku Co., Ltd., and 3 parts by weight of 2-hydroxy-2-methyl-propiophenone. 100 parts by weight of the photo-polymerizable composition were admixed with 0.1 part by weight of microbeads of polymethyl methacrylate (PMMA) having an average particle size of 0.1 μm. The resulting composition was subjected to an UV-radiation to obtain a cured sheet.

The haze value of the cured sheet was determined, and the test results are shown in Table 1.

EXAMPLE 7

The procedures of Example 6 were repeated to obtain a cured sheet, except that use was made of 0.5 part by weight of the microbeads of polymethyl methacrylate shown in Example 6.

The haze value of the cured sheet was determined, and the test results are shown in Table 1.

COMPARATIVE EXAMPLE 6

The procedures of Example 6 was repeated to obtain a cured sheet, except that the microbeads of polymethyl methacrylate were not used.

The haze value of the cured sheet was determined, and the test results are shown in Table 1.

EXAMPLE 8

A photo-polymerizable resin composition was prepared by mixing 60 parts by weight of 2-hydroxy-3-phenoxy-propyl acrylate (refractive index: 1.524), 40 parts by weight of a polypropylene glycol/phenyl isocyanate adduct (refractive index: 1.468) and 3 parts by weight of 2-hydroxy-2-methyl-propiophenone. 100 parts by weight of the photo-polymerizable resin composition were admixed with 0.1 part by weight of microbeads of polymethyl methacrylate (PMMA) having an average particle size of 0.1 μm.

The resulting composition was subjected to an UV irradiation as in the case of Example 1, so that a cured sheet was obtained.

The haze value of the cured sheet was determined, and the test results are shown in Table 1.

COMPARATIVE EXAMPLE 7

The procedures of Example 6 were repeated to obtain a cured sheet, except that the microbeads of polymethyl methacrylate were not employed.

The haze value of the cured sheet was determined, and the test results are shown in Table 1.

TABLE 1

| | | Filler | | | Thickness of cured sheet (μm) | Maximum haze value (%) | Minimum haze value (%) |
| --- | --- | --- | --- | --- | --- | --- | --- |
| | Species | Amount used (parts by weight) | Average particle size (μm) | Shape | | | |
| Example 1 | A | 0.05 | 1-2 | Microbeads | 75 | 73 | <5 |
| Example 2 | A | 1.0 | 1-2 | Microbeads | 75 | 81 | <5 |
| Example 3 | A | 0.05 | 5 | Irregular | 75 | 79 | <5 |
| Example 4 | B | 0.05 | 10 | Irregular | 75 | 51 | <5 |
| Example 5 | C | 0.4 | 5 | Irregular | 100 | 80 | <5 |
| Comparative Example 1 | — | — | — | — | 75 | 20 | <5 |

TABLE 1-continued

| | Filler | | | | | |
| --- | --- | --- | --- | --- | --- | --- |
| Species | Amount used (parts by weight) | Average particle size (μm) | Shape | Thickness of cured sheet (μm) | Maximum haze value (%) | Minimum haze value (%) |
| Comparative Example 2 | — | — | — | — | 200 | 80 | <5 |
| Comparative Example 3 | A | 7.5 | 1-2 | Microbeads | 75 | 90 | 50 |
| Comparative Example 4 | A | 0.005 | 1-2 | Microbeads | 75 | 20 | <5 |
| Comparative Example 5 | A | 0.05 | 75 | Microbeads | 75 | 20 | <5 |
| Example 6 | D | 0.1 | 0.1 | Microbeads | 75 | 48 | 2 |
| Example 7 | D | 0.5 | 0.1 | Microbeads | 75 | 54 | 2 |
| Comparative Example 6 | — | — | — | — | 75 | 3 | 0 |
| Example 8 | D | 0.1 | 0.1 | Microbeads | 75 | 64 | 4 |
| Comparative Example 7 | — | — | — | — | 75 | 58 | 4 |

Note
Fillers:
A Aliphatic polyacrylate
B Silica
C Phthalocyanine
D Polymethyl methacrylate

We claim:

1. A resin composition for light control sheets, which comprises:
   (A) 100 parts by weight of at least one photo-polymerizable resin composition selected from the group consisting of:
   (i) compositions which contain at least two different monomers or oligomers each having a polymerizable carbon-carbon double bond, with the proviso that these different monomers or oligomers may form polymers having different refractive indexes,
   (ii) compositions which contain a compound having no polymerizable carbon-carbon double bond, and also contain at least one monomer or oligomer which has a polymerizable carbon-carbon double bond and which is convertible into a polymer having a refractive index different from that of said compound; and
   (iii) compositions which contain at least one monomer or oligomer having at least two polymerizable carbon-carbon double bonds in the molecule, with the proviso that the refractive index of the monomer or oligomer is different from that of a polymer formed from said monomer or oligomer; and
   (B) 0.01 to 5 parts by weight of a filler having an average particle size of 0.05-20 μm.

2. A resin composition as defined in claim 1, wherein the filler is an inorganic or organic filler.

3. A resin composition as defined in claim 2, wherein the inorganic filler is selected from the group consisting of silica, calcium carbonate, alumina and mixtures thereof.

4. A resin composition as defined in claim 3, wherein the inorganic filler is silica.

5. A resin composition as defined in claim 2, wherein the organic filler is selected from the group consisting of polyesters, polyamides, polystyrenes, polycarbonates and polyacrylates.

6. A resin composition as defined in claim 5, wherein the organic fillers is a polyacrylate.

7. A resin composition as defined in claim 1, wherein the filler is a pigment.

8. A resin composition as defined in claim 7, wherein the filler is a phthalocyanine pigment.

9. A resin composition as defined in claim 1, wherein the filler has an average particle size of 0.1 to 10 μm.

10. A resin composition as defined in claim 1, wherein the filler is used in an amount of 0.03 to 3 parts by weight.

11. A resin composition as defined in claim 10, wherein the filler is used in an amount of 0.05 to 1 part by weight.

12. A light control sheet, which has been obtained by a light irradiation on a resin composition for the light control sheet, characterized in that the resin composition comprises:
   (A) 100 parts by weight of at least one photo-polymerizable resin composition selected from the group consisting of:
   (i) compositions which contain at least two different monomers or oligomers each having a polymerizable carbon-carbon double bond, with the proviso that these different monomers or oligomers may form polymers having different refractive indexes,
   (ii) compositions which contain a compound having no polymerizable carbon-carbon double bond, and also contain at least one monomer or oligomer which has a polymerizable carbon-carbon double bond and which is convertible into a polymer having a refractive index different from that of said compound; and
   (iii) compositions which contain at least one monomer or oligomer having at least two polymerizable carbon-carbon double bonds in the molecule, with the proviso that the refractive index of the monomer or oligomer is different from that of a polymer formed from said monomer or oligomer; and
   (B) 0.01 to 5 parts by weight of a filler having an average particle size of 0.05-20 μm.

* * * * *